Aug. 8, 1967    H. W. DIETERT    3,334,493
TEMPERATURE CONTROLLED STRUCTURE FOR AND
METHOD OF COOLING GRANULAR MATERIAL
Filed May 16, 1966    3 Sheets-Sheet 1

INVENTOR.
HARRY W. DIETERT
BY Whittemore,
Hulbert & Belknap
ATTORNEYS

Aug. 8, 1967 H. W. DIETERT 3,334,493
TEMPERATURE CONTROLLED STRUCTURE FOR AND
METHOD OF COOLING GRANULAR MATERIAL
Filed May 16, 1966 3 Sheets-Sheet 3
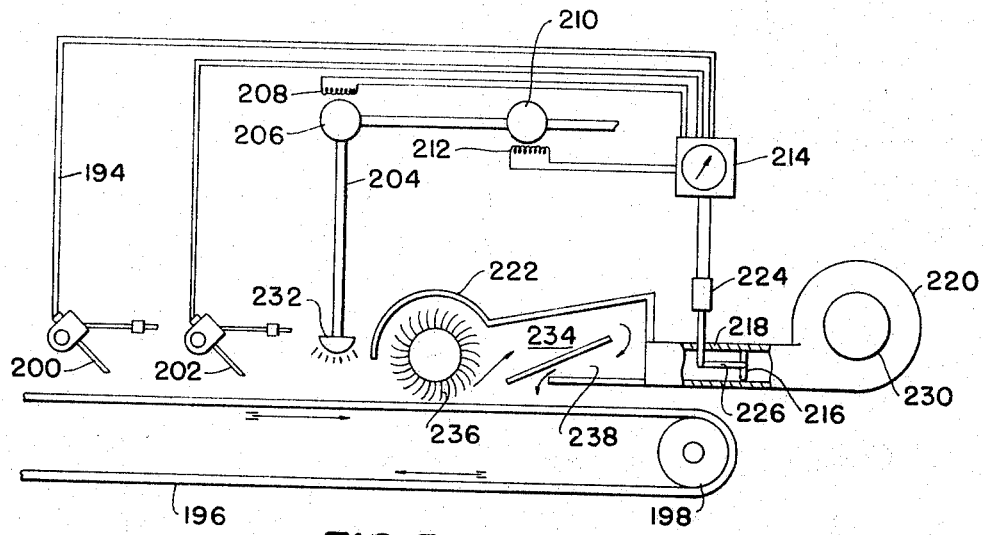
FIG.5
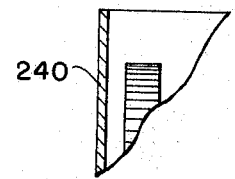
INVENTOR.
HARRY W. DIETERT
BY
ATTORNEYS

United States Patent Office 3,334,493
Patented Aug. 8, 1967

3,334,493
TEMPERATURE CONTROLLED STRUCTURE FOR AND METHOD OF COOLING GRANULAR MATERIAL
Harry W. Dietert, Kerrville, Tex., assignor to Harry W. Dietert Co., Detroit Mich., a corporation of Michigan
Filed May 16, 1966, Ser. No. 550,418
7 Claims. (Cl. 62—157)

The invention relates to conditioning of granular material and refers more specifically to cooling of granular material prior to treating the granular material to provide a predetermined moldability thereof, whereby the granular material will always be delivered to the moldability controller at a temperature not higher than a predetermined maximum temperature.

In the past it has been the general practice to cool granular material prior to treating the granular material to provide a predetermined moldability by first sensing the temperature of the granular material, adding water to the granular material in accordance with the sensed temperature, and passing air through the granular material and water at a constant rate for a fixed time. Such procedure is wasteful of time when the granular material is not at its maximum temperature and is wasteful of power consumed in the cooling operation. In addition, it is undesirable to blow excessive cooling air through the granular material since the blowing removes a certain amount of fine material, such as bonding additives and the like.

It is therefore an object of the invention to provide improved structure for cooling granular material.

Another object is to provide structure for cooling granular material wherein the temperature of the granular material is sensed and air blown through the granular material at a constant volume for a time determined by the sensed original temperature of the granular material and water is added to the granular material in proportion to the air blown therethrough.

Another object is to provide structure for cooling granular material as set forth above and further including means for varying the rate of flow of air and water into the granular material in accordance with the original temperature of the granular material.

Another object is to provide structure as set forth above and further including means for measuring the temperature of the granular material as it is mixed and for stopping the blowing of air therethrough when the granular material has reached a predetermined temperature.

Another object is to provide structure as set forth above wherein the granular material is cooled in batches and the air is blown through and water added to the granular material during the entire cooling cycle.

Another object is to provide structure for cooling granular material as set forth above wherein the granular material is cooled in batches, the water is added to the granular material in a batch and the air is blown through the granular material during the entire cooling cycle.

Another object is to provide structure as set forth above wherein the granular material is cooled continuously with the water being added to and air blown through the granular material continuously.

Another object is to provide an improved method of cooling granular material.

Another object is to provide a method of cooling granular material comprising sensing the temperature of granular material to be cooled and passing water into and air through the granular material for a time determined by the original temperature of the granular material.

Another object is to provide a method as set forth above and including regulating the rate of addition of water and air to the granular material in accordance with the initial temperature thereof.

Another object is to provide structure for and a method of cooling granular material which is simple, economical and efficient.

Other objects and features of the invention will become apparent as the description proceeds, especially when taken in conjunction with the accompanying drawings, illustrating a preferred embodiment of the invention, wherein:

FIGURE 5 is a modification of the apparatus for cooling granular material by the continuous method illustrated in FIGURE 4, and including means for varying the flow-rate of water to the granular material.

With particular reference to the figures of the drawings, one embodiment of the present invention will now be disclosed in detail.

Figure 1:
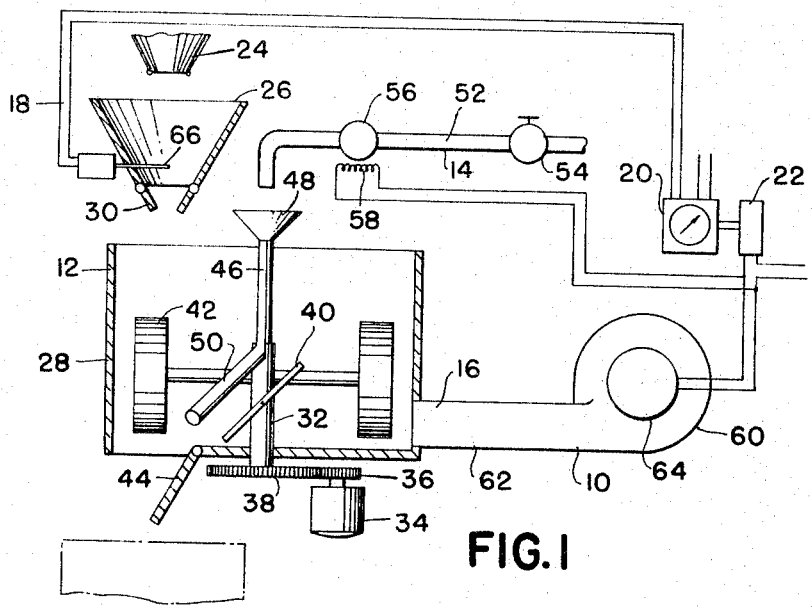
FIGURE 1 is a diagrammatic representation of apparatus for cooling granular material in batches by the end-point method, constructed in accordance with the invention.

As illustrated in FIGURE 1, the apparatus 10 for cooling granular material includes the batch type granular material handling structure 12, apparatus 14 for delivering water into granular material to be cooled and apparatus 16 for blowing air through the granular material to be cooled. Structure 18 is provided to develop an electric signal in accordance with the temperature of the granular material to be cooled in conjunction with the signal sensing and control unit 20 which drives the timer 22.

More specifically, the material handling structure 12 for cooling granular material includes the bin 24 in which granular material to be cooled is stored. When granular material is needed, the granular material from bin 24 is passed to the batch hopper 26 where it is measured as to quantity. The batches of granular material from the batch hopper 26 are then delivered into the cooling mixer 28 by means of pivoted doors 30 or the like.

Cooling mixer 28 includes the rotatable shaft 32 therein which may be rotated by the motor 34 through gears 36 and 38 or similar structure. Plows 40 and rollers 42 are secured to the shaft 32 for moving granular material within the mixer 28 so that it may be more easily cooled by water deposited therein and air blown therethrough. After a cooling operation the batch of granular material is discharged from the mixer through the pivoted door 44.

The structure for feeding water into the granular material in the mixer 28 includes the offset funnel member 46 secured to the shaft 32 for rotation therewith adapted to receive water at the end 48 thereof and discharge water from the end 50 beneath the surface of granular material in the mixer 28. The structure 14 for feeding water into the mixer 28 further includes the water supply pipe 52 having the hand operated flow-rate valve 54 and the on-off valve 56 therein which on-off valve 56 is operated by the soelnoid 58.

The structure for blowing air through the batch of granular material in the mixer 28 includes the blower 60 connected by means of the air conduit 62 to the mixer 28. Blower motor 64 is provided in conjunction with the blower 60 so that air is blown into the mixer 28 on energizating the blower motor 64.

Apparatus 18 for sensing the original or initial temperature of granular material to be cooled comprises a thermocouple 66 in the batch hopper 26, which thermocouple in accordance with the usual operation of thermocouples, developes an electric signal proportional to the temperatures of the granular material in the batch hopper 26. The thermocouple could be positioned in the bin 24 or in the mixer 28.

The signal sensing and control unit 20 is a standard control unit and is used to amplify the signal from the thermocouple 66 and to provide control electric signals proportional thereto. Such devices are commercially available from the Harry W. Dietert Co. of Detroit, Michigan. Therefore, the details of the signal sensing and control unit will not be considered herein. In the structure of FIGURE 1 the electric signal from the control unit 20 is used to set the timer 22 for a time proportional to the temperature of the granular material in the batch hopper 26 in each cooling cycle.

Thus, in overall operation, when it is desired to provide granular material, such as sand, stored in the storage bin 24 at a predetermined maximum temperature from the cooling mixer 28, a batch of said material from the bin 24 is fed into the batch hopper 26 where the temperature thereof is sensed by the thermocouple 66, and an electric signal is passed to the signal sensing and control unit 20 in accordance with the sensed temperature of the sand. The timer 22 is thus set for a specific time, depending on the temperature sensed by the thermocouple 66.

The granular material in the hopper 26 is then discharged into the cooling mixer 28 and the solenoid 58 and blower motor 64 are energized through timer 22, the rate of flow of water through the water supply pipe 52 having previously been set by hand by means of the flow-rate valve 54. Water will thus be added through funnel 46 into the granular material in the mixer 28 at a predetermined rate, while air is blown through the granular material from the blower 60 to cool the granular material. After a predetermined time the timer cuts off the motor 64 and causes the valve 56 to close, at which time the granular material in the cooling mixer 28 will be below the predetermined maximum temperature.

The time for the timer to be on during the cooling cycle is predetermined for the amount of water and air passed through the granular material at the initial temperature of the granular material and is designed into the apparatus 10. Thus, excessive blowing of the granular material in the cooling mixer 28 is prevented and an optimum balance of water addition and air blowing through the granular material for the predetermined initial temperature of the granular material to provide the required cooling thereof is provided.

Figure 2:
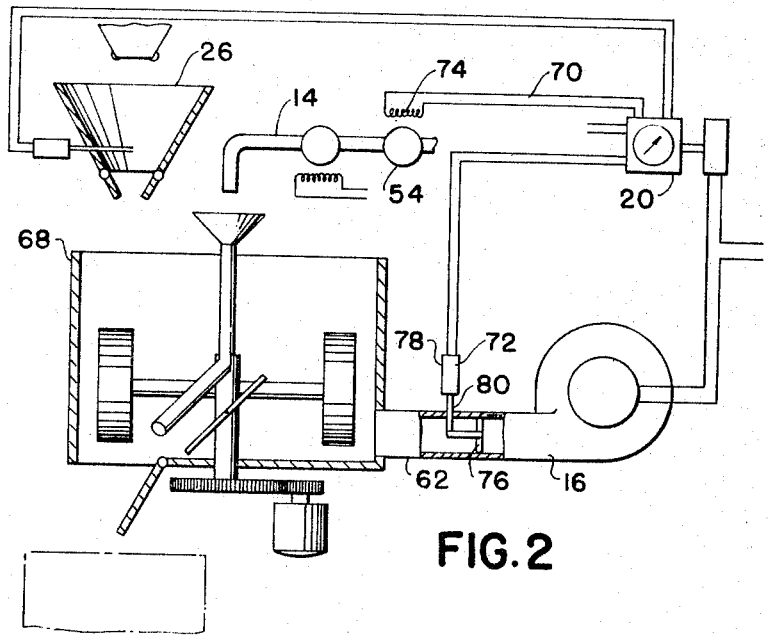
FIGURE 2 is a modification of the structure illustrated in FIGURE 1 wherein the flow-rate of the water and air are controlled in accordance with the sensed original temperature of the granular material.

The modified granular material cooling structure 68 illustrated in FIGURE 2 is exactly the same as the granular material cooling apparatus 10 of FIGURE 1, except automatic flow-rate controls 70 and 72 have been provided in conjunction with the water supply apparatus 14 and air supply apparatus 16. Thus, in the apparatus of FIGURE 2, the flow-rate of water is controlled by the solenoid 74 actuating the valve flow-rate 54 in accordance with the initial temperature of the granular material in the hopper 26 as sensed by the signal sensing and control unit 20. Similarly the air flow-rate control vane 76 in the air conduit 62, as shown, is controlled by the solenoid 78 actuated by the signal sensing and control unit 20 in accordance with the temperature of the granular material in the hopper 26 through the mechanical linkage 80. Alternatively the blower motor and water on-off valve may be controlled by a master material conditioning cycle timer (not shown), and only the flow-rate of air and water or either varied in accordance with material temperature.

Also, the throttling valve 54 may be controlled by the throttling vane 76 if desired.

Figure 3:
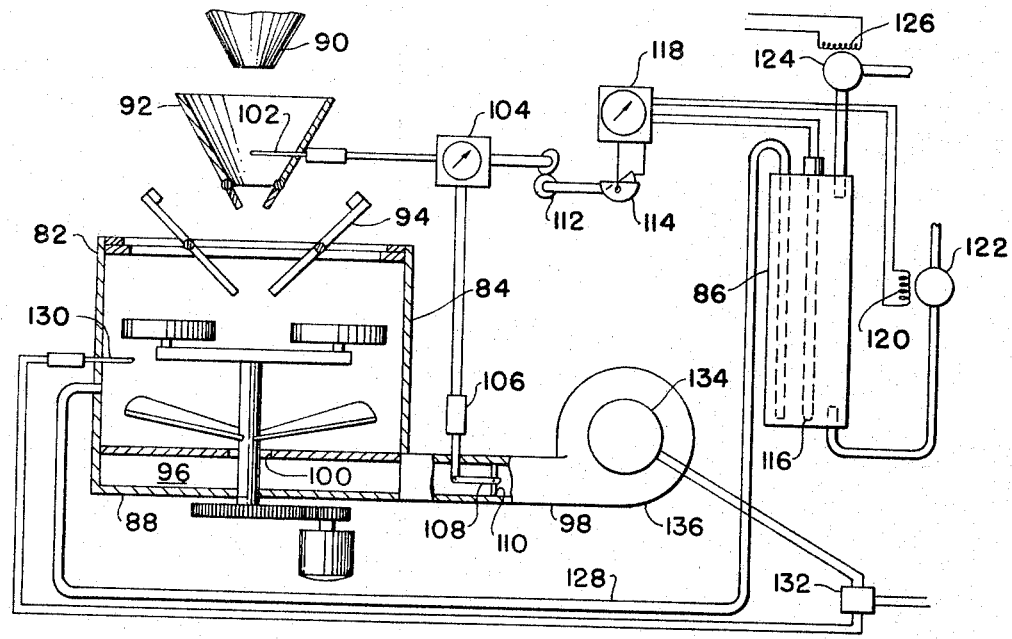
FIGURE 3 is a diagrammatic representation of apparatus for cooling granular material in accordance with the invention by the batch method.

The granular material cooling apparatus 82 illustrated in FIGURE 3 is a water batch type apparatus in contrast to the end-point apparatus illustrated in FIGURES 1 and 2 in which the water is added throughout the cooling cycle. In contrast, in the granular material cooling apparatus 82 of FIGURE 3, the water is added to the cooling mixer 84 in a batch from the water batch tank 86.

As before, the granular material handling structure 88 includes a storage bin 90, a batch hopper 92 and the cooling mixer 84. The cooling mixer 84 is somewhat modified from the cooling mixer 28 in that pivoted closure means 94 are provided therefor and a plenum chamber 96 is provided at the bottom thereof into which air from the air conduit 98 is passed which proceeds upwardly through opening 100 in the bottom of the mixer 84 through granular material therein.

The thermocouple 102 and signal sensing and control unit 104 are similar to the thermocouple 66 and control unit 20. The signal sensing and control unit 104 again acts through solenoid 106 and linkage 108 to position the air flow-rate control vane 110 in the air supply conduit 98. Cam structure 112 is operable by the signal sensing and control unit 104 to position a variable condenser 114 in accordance with the initial temperature of the granular material in the batch hopper 92. The capacitance of the condenser 114 is balanced against the capacitance of a probe 116 in water tank 86 in a bridge circuit in a standard control unit 118 to actuate solenoid 120 when a predetermined quantity of water is in the water tank 86 whereby the water supply on-off valve 122 is turned off. Subsequently the solenoid 126 is energized as by a master cycle timer to open the air valve 124 to permit air to enter the tank 86 and blow the batch of water therein through the water conduit 128 and into granular material in the mixer 84.

The temperature of the granular material in the mixer 84 is constantly checked by means of the thermocouple 130 and the switch 132 is actuated to turn off the motor 134 of the blower 136 when the temperature of the granular material in the mixer 84 arrives at a predetermined maximum value.

Thus, in overall operation of the batch type granular material cooling apparatus illustrated in FIGURE 3, the batch of granular material is again first placed in the batch hopper 92, the cam 112 and vane 110 are positioned by the signal sensing and control unit 104 and the water tank 86 is filled to the point where the capacitance of capacitor 114 in conjunction with the capacitance of capacitor 116 shuts the water in the tank 86 off at a quantity of water in the tank 86 determined by the setting of the cams 112. The water in the tank 86 is subsequently blown into the granular material which has been transferred into the cooling mixer 84 and the blower 134 is started by the master timer. As the granular material reaches the desired maximum temperature thereof, the blower motor is turned off by switch 132 in response to the temperature of the granular material in the mixer 84 being sensed by the thermocouple 130.

Alternatively the water in tank 86 may be blown into mixer 84 in response to a signal from a master timer before the granular material is placed in the mixer 84. Also, mixer 84 may be used as a moldability conditioning mixer in a conditioning cycle for granular material after the cooling portion of the cycle if only a single mixer is available.

Figure 4:
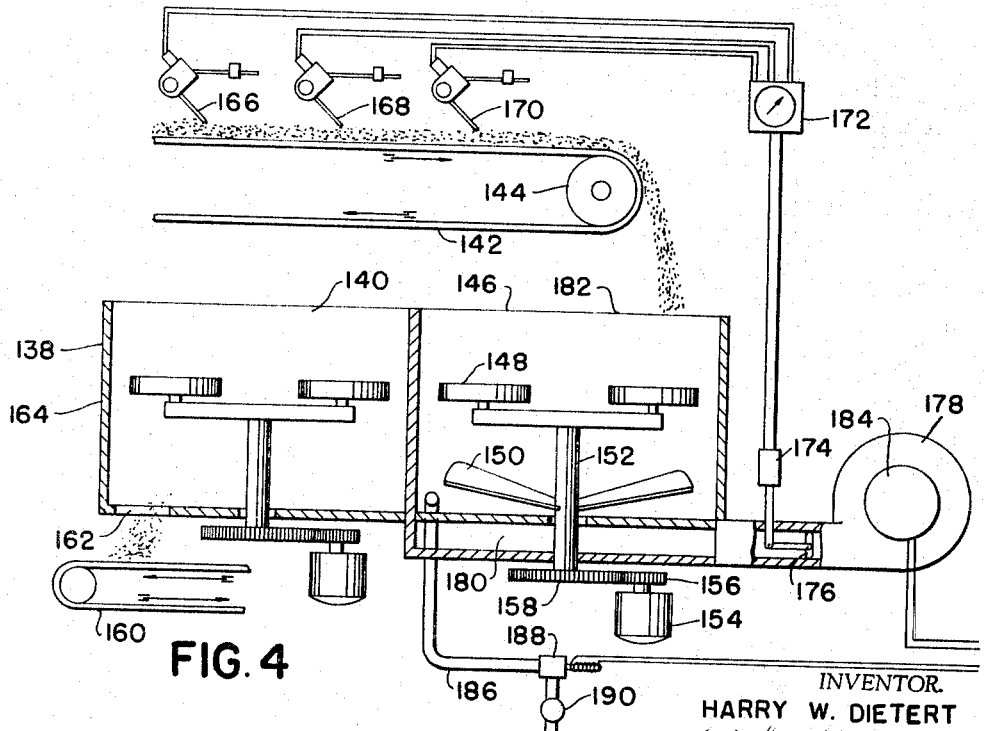
FIGURE 4 is a diagrammatic illustration of apparatus for cooling granular material constructed in accordance with the invention by the continuous cooling method.

The apparatus 138 illustrated in FIGURE 4 for cooling granular material in accordance with the invention in a continuous operation includes the granular material handling structure 140 including the continuous conveyer belt 142 which may be driven in the direction indicated by drive means 144, a dual compartment cooling mixer 146 including mixing wheels 148 and plows 150 mounted on shaft 152 and rotated by motor means 154 through gears 156 and 158 or the like. Conveyer 160 is provided to convey the cooled granular material deposited thereon through opening 162 in the portion 164 of the cooling mixer 146 away from the mixer.

Conventional sensing means 166, 168 and 170 are positioned over the conveyer 142 to sense the volume, temperature and moisture, respectively, of the granular material moving on the belt 142. The sensing structures are commercial items and will therefore not be considered in detail.

The sensing structures 166, 168, and 170 provide an electrical signal proportional to the magnitude of the volume, temperature and moisture parameters sensed to the signal sensing and control unit 172. The signal sensing and control unit 172 in turn through solenoid structure 174 and air flow rate control vane 176 control the air passed from blower 178 into the plenum 180 and through the granular material in the compartment 182 of the mixer 146. The starting and stopping of the blower motor 184 and delivery of water into the mixer 146 through pipe 186 on opening of valve 188 at a pressure regulated by pressure regulator 190 may be controlled through a master timer or switch (not shown). Alternatively the water added to the mixer 146 through pipe 186 may be controlled through unit 172 in accordance with the sensed temperature of the granular material.

In the continuous granular material cooling structure 194 illustrated in FIGURE 5, the granular material is passed along belt 196 in the direction illustrated by the arrows due to driving of the belt 196 through drive means 198. As the granular material is moved along the belt 196, the volume and temperature thereof are sensed by the volume sensing apparatus 200 and the temperature sensing apparatus 202 positioned over the belt 196. Water is supplied to the granular material on the belt 196 through water pipe 204 on opening of the valve 206 through energizing solenoid 208 at a rate controlled by the rate-control valve 210 determined by the signal to the solenoid 212 from the signal sensing and control unit 214.

The signal from the signal sensing and control unit 214 is determined by the temperature and volume of granular material on the belt 196 as sensed by the sensing structures 200 and 202, as before. Similarly the air flow rate-control vane 216 in air conduit 218 between blower 220 and structure 222 for tumbling the granular material on the conveyer 196 in the direction illustrated is actuated by the solenoid 224 and linkage 226, as before. Blower motor 230 may be continuously operated.

In operation water is placed on the granular material on conveyer 196 in accordance with the volume and temperature of the granular material from the sprayhead 232, after which the granular material is swept up into the area 234 of the tumbling structure 222 by the rotating brush 236. The granular material then passes into the area 238 of the structure 222 from which it is blown back toward the brush 236 and onto the conveyer 196 from which it eventually travels to the moldability controller mixer 240.

While one embodiment and several modifications of the invention have been disclosed herein, other modifications and embodiments are contemplated. For example, in the continuous cooling structure, an oscillating trough with a slotted bottom plate or screen for blowing air through may be used rather than a mixer or conveyer as in FIGURES 4 and 5. It is the intention to include all embodiments and modifications as are defined by the appended claims within the scope of the invention.

What I claim as my invention is:

1. Apparatus for cooling granular material comprising means for sensing the temperature of the granular material and developing an electric signal representative of the temperature of the granular material, means for adding water to the granular material including a flow rate valve and an on-off valve, means for blowing air through the granular material including a blower, and means operable in response to the means for sensing the temperature of the granular material and developing a signal representative of the temperature of the granular material and positioned between the means for sensing the temperature of the granular material and developing a signal representative of the temperature of the granular material and the means for blowing air through the granular material for varying the air blown through the granular material and the water added to the granular material in accordance with the temperature of the granular material including a timer for timing the length of time the blower is on.

2. Apparatus for cooling granular material comprising means for sensing the temperature of the granular material and developing an electric signal representative of the temperature of the granular material, means for adding water to the granular material including a flow rate valve and an on-off valve, means for blowing air through the granular material including a blower, a variable air flow rate vane in conjunction therewith and a blower motor, and means operable in response to the means for sensing the temperature of the granular material and developing a signal representative of the temperature of the granular material and positioned between the means for sensing the temperature of the granular material and developing a signal representative of the temperature of the granular material and the means for blowing air through the granular material for varying the air blown through the granular material and the water added to the granular material in accordance with the temperature of the granular material including a signal sensing and control unit operable to vary the flow rate valve and the vane in accordance with the electric signal developed by the temperature sensing means.

3. Structure as set forth in claim 2 and further including timing means connected to the signal sensing and control unit for setting in accordance with the sensed temperature of the granular material and connected to the on-off valve and blower motor for turning the on-off valve and blower motor on for a time determined by the sensed temperature of the granular material.

4. Apparatus for cooling granular material comprising means for sensing the temperature of the granular material and developing an electric signal representative of the temperature of the granular material, means for adding water to the granular material including means for storing a predetermined volume of water and then discharging it in a batch into the granular material, means for blowing air through the granular material including a blower having a flow rate vane in conjunction therewith, and means operable in response to the means for sensing the temperature of the granular material and developing a signal representative of the temperature of the granular material and positioned between the means for sensing the temperature of the granular material and developing a signal representative of the temperature of the granular material and the means for blowing air through the granular material for varying the air blown through the granular material and the water added to the granular material in accordance with the temperature of the granular material including means for varying the position of the vane and for varying the predetermined amount of water in accordance with the temperature sensed.

5. Structure as set forth in claim 4 wherein the means for blowing air through the granular material further includes a blower motor and further including means for sensing the temperature of the granular material as it is cooled and controlling the operation of the blower motor in accordance with the sensed temperature of the granular material as it is cooled.

6. Apparatus for cooling granular material in a continuous operation comprising means for sensing the temperature, moisture content and volume of the granular material, a signal sensing and control unit responsive to the sensed temperature, moisture content and volume for developing an electric signal representative thereof, means for adding water to the granular material, means for blowing air through the granular material including a blower having a variable air flow rate vane in conjunction therewith, and means operable in response to the means for sensing the temperature, moisture content and volume of the granular material and developing a signal representative of the temperature, moisture content and volume of the granular material and positioned between the means for sensing the temperature, moisture content and volume of the granular material and developing a signal representative of the temperature, moisture content and volume of the granular material and the means for blowing air through the granular material for positioning the vane to vary the air blown through the granular material and for varying the water added to the granular material in accordance with the temperature, moisture content and volume of the granular material.

7. Apparatus for cooling granular material in a continuous operation comprising means for sensing the temperature and volume of the granular material and developing an electric signal representative of the temperature and volume of the granular material, means for adding water to the granular material including a flow rate valve and an on-off valve, means for blowing air through the granular material including a blower and a variable air flow rate vane in conjunction therewith, and means operable in response to the means for sensing the temperature and volume of the granular material and developing a signal representative of the temperature and volume of the granular material and positioned between the means for sensing the temperature and volume of the granular material and developing a signal representative of the temperature and volume of the granular material and the means for blowing air through the granular material for varying the air blown through the granular material and the water added to the granular material in accordance with the temperature of the granular material including means for controlling the position of the vane in accordance with the developed signal and means for regulating the flow rate valve and the on-off valve automatically in accordance with the developed electric signal.

References Cited
UNITED STATES PATENTS

| | | | |
|---|---|---|---|
| 2,185,878 | 1/1940 | Adams et al. | 34—53 X |
| 2,314,486 | 3/1943 | Dvorak | 62—64 X |
| 2,648,206 | 8/1953 | Carr | 62—64 X |
| 2,863,190 | 12/1958 | Buhrer | 34—62 X |
| 3,233,335 | 2/1966 | Neitzel et al. | 34—48 |

EDWARD J. MICHAEL, *Primary Examiner.*

R. A. O'LEARY, *Examiner.*

W. E. WAYNER, *Assistant Examiner.*